United States Patent [19]

Jameson et al.

[11] 4,392,391
[45] Jul. 12, 1983

[54] MULTISPEED REVERSIBLE POWER SHIFT TRANSMISSION

[75] Inventors: James J. Jameson; John M. Beeson, both of Coffeyville, Kans.

[73] Assignee: Cooper Industries, Inc., Houston, Tex.

[21] Appl. No.: 204,817

[22] Filed: Nov. 7, 1980

[51] Int. Cl.³ .............................................. F16H 3/08
[52] U.S. Cl. ...................................... 74/333; 74/331; 74/356; 74/359; 74/360
[58] Field of Search ................. 74/331, 333, 360, 359, 74/356

[56] References Cited

U.S. PATENT DOCUMENTS

| | | | |
|---|---|---|---|
| B 358,244 | 1/1975 | Jameson | 74/360 |
| 2,599,801 | 6/1952 | Youngren et al. | 74/331 |
| 3,064,488 | 11/1962 | Lee et al. | 74/360 |
| 3,080,767 | 3/1963 | Price | 74/360 |
| 3,130,595 | 4/1964 | Cook | 74/331 |
| 3,181,385 | 5/1965 | Siler | 74/360 |
| 3,269,203 | 8/1966 | Frost | 74/333 |
| 3,318,167 | 12/1964 | Frost | 74/333 |
| 3,350,951 | 11/1967 | Frost et al. | 74/360 |
| 3,425,293 | 2/1969 | Krawczyk et al. | 74/360 |
| 3,465,609 | 9/1969 | Fisher et al. | 74/360 |
| 3,858,455 | 1/1975 | Sisson et al. | 74/360 |
| 3,893,345 | 7/1975 | Sisson et al. | 74/331 |
| 3,913,411 | 10/1975 | Jameson | 74/360 |
| 3,916,710 | 11/1975 | Sisson et al. | 74/331 |
| 3,916,711 | 11/1975 | Hoyer | 74/360 |
| 3,916,714 | 11/1975 | Sisson et al. | 74/331 |
| 4,031,762 | 6/1977 | Shellberg | 74/331 |
| 4,145,935 | 3/1979 | Herlitzek | 74/331 |
| 4,200,006 | 4/1980 | Ehrlinger et al. | 74/681 |
| 4,245,519 | 1/1981 | Herlitzek | 74/331 |

FOREIGN PATENT DOCUMENTS

| | | | |
|---|---|---|---|
| 2904062 | 8/1980 | Fed. Rep. of Germany | 74/333 |
| 740543 | 6/1980 | U.S.S.R. | 74/331 |

Primary Examiner—Lawrence J. Staab
Assistant Examiner—Joseph M. Rolnicki
Attorney, Agent, or Firm—Eddie E. Scott; Michael D. McCully

[57] ABSTRACT

A multispeed constant mesh gear transmission includes an input shaft together with first, second and third intermediate shafts arranged in a diamond or cruciform configuration together with an output shaft having an axis of rotation lying in a plane including the input shaft and the third intermediate shaft. In two different embodiments each of the three intermediate shafts include two multiplate fluid actuatable clutches shiftable under load. A plurality of gear trains selectively drive an output shaft at six different rotative speed ratios with respect to the input shaft in one direction of rotation of the output shaft and at three different speed ratios in the opposite or reverse direction of rotation of the output shaft. In one embodiment a total of six clutches and fourteen gears provide for the speed ratios and in a second embodiment a total of twelve gears and six clutches provide for the six forward and three reverse speed ratios.

1 Claim, 6 Drawing Figures

| | FWD. | REV. |
|---|---|---|
| 1 | 46+36 | 62+36 |
| 2 | 30+36 | 62+48 |
| 3 | 46+48 | 62+64 |
| 4 | 40+48 | |
| 5 | 46+64 | |
| 6 | 30+64 | |

| | FWD. | REV. |
|---|---|---|
| 1 | 106+96 | 132+96 |
| 2 | 90+96 | 132+108 |
| 3 | 106+108 | 132+134 |
| 4 | 90+108 | |
| 5 | 106+134 | |
| 6 | 90+134 | |

MULTISPEED REVERSIBLE POWER SHIFT TRANSMISSION

BACKGROUND OF THE INVENTION

1. Field of the Invention

The present invention pertains to an improved arrangement of gearing and clutches in a multispeed, reversible, constant mesh gear transmission having plural clutches engageable and disengageable under load.

2. Background Art

Multispeed reversible gear transmissions of the constant mesh and so-called power shiftable type are widely used in heavy duty vehicular applications and construction equipment. Such applications of gear transmissions require a wide range of speed ratios between the transmission input shaft and output shaft in both forward and reverse directions of rotation in order to provide satisfactory vehicle movement under widely varying load conditions and to optimize the vehicle engine operating speed range for maximum efficiency and power output. Accordingly, a number of transmission designs have been developed in an effort to provide a compact transmission unit having a maximum number of input to output gear ratios in a forward direction as well as reverse direction of rotation of the output shaft with respect to the input shaft.

In the art of constant mesh gear transmissions for heavy duty vehicles and construction equipment it is desirable to provide arrangements of the gearing and rotating shafts of transmissions having different speed ratio capabilities which are adaptable to be used in the same transmission housing and which use a relatively large number of common parts to reduce manufacturing costs and to improve serviceability.

Moreover, the continued effort to develop various types of equipment which operate satisfactorily with smaller engines for economy of operation has necessitated the development of transmissions having a greater number of gear speed ratios in both forward and reverse direction to provide satisfactory equipment performance. It is, of course, desirable to be able to maximize the number of gear ratios while at the same time minimizing the number of gears and clutches required to provide speed and direction change of the transmission output shaft with respect to the input shaft.

SUMMARY OF THE INVENTION

The present invention provides a multispeed reversible power transmission of the constant mesh gear type which provides for a wide range of gear ratios in a forward as well as a reverse direction of rotation of the output shaft with respect to the input shaft while utilizing a minimum number of gears and associated directional and speed change clutches.

In accordance with the present invention there is provided a multispeed constant mesh gear transmission having an input shaft together with first, second and third shafts supporting speed and direction change gearing and clutches arranged in a compact, cruciform pattern together with an output shaft vertically displaced from the input shaft in the so-called drop configuration.

Further in accordance with the present invention there is provided an improved multispeed power shift transmission having six speed ratios between the input shaft and the output shaft in one direction of rotation of the output shaft with respect to the input shaft, and three speed ratios between the respective shafts in the opposite direction of rotation. The improved range of speed ratios in two directions of rotation of the output shaft is provided by a total of six separate fluid actuated clutches, two clutches being mounted on each of the respective first, second and third intermediate shafts.

In accordance with yet another aspect of the present invention a multispeed power shiftable transmission is provided having six speed ratios between the input and output shafts in one direction of rotation and three speed ratios between said shafts in the opposite direction of rotation of the output shaft and having a minimum number of gears required to obtain the desired speed ratios and direction of rotation of the output shaft.

In accordance with the present invention an improved multispeed constant mesh gear transmission is provided having fluid actuated clutches which are shiftable under load to obtain six input to output speed ratios in one direction of rotation of the output shaft and three input to output speed ratios in the opposite direction of rotation of the output shaft, which transmission is compact and arranged in a preferred configuration of the respective input, output and clutch shafts.

Further in accordance with the present invention there is provided a six speed constant mesh power shift transmission having three speeds in reverse and adapted to be driven by a hydrodynamic torque converter coupling between the prime mover and the transmission and including an auxiliary power takeoff shaft driven directly by the torque convertor impeller.

In accordance with one embodiment of the present invention the torque converter output shaft includes an input gear meshed with a first gear mounted on a first intermediate shaft, which first gear is meshed with a second gear mounted on a second intermediate shaft. The first gear also rotatably supports an idler gear mounted between the first gear and one of the directional clutches.

In accordance with yet another embodiment of the present invention the torque convertor output shaft is connected to an input gear which is in constant mesh with a first gear mounted on one of the intermediate shafts, said first gear being connected to one of the forward directional clutches and meshed with respective second and third directional clutch gears on the second and third intermediate shafts.

Still further in accordance with the present invention there is provided a multispeed constant mesh gear type transmission shiftable under load having an input shaft, first, second and third intermediate shafts and a fourth or output shaft all arranged such that the input shaft the third shaft and the output shaft are arranged to lie in a common plane intersected by a plane including the first and second intermediate shafts. This general arrangement of the layout of the shafting provides a transmission with six speeds in one direction of rotation and three speeds in the opposite direction of rotation of the output shaft and wherein the transmission has a total of six clutches and fourteen gears in one embodiment and a total of six clutches and twelve gears in another embodiment.

The superior features of the present invention will be further appreciated upon reading the detailed description which follows in conjunction with the schematic diagram of two embodiments of the present invention shown in the accompanying drawings.

DESCRIPTION OF THE PREFERRED EMBODIMENTS

Figure 1:
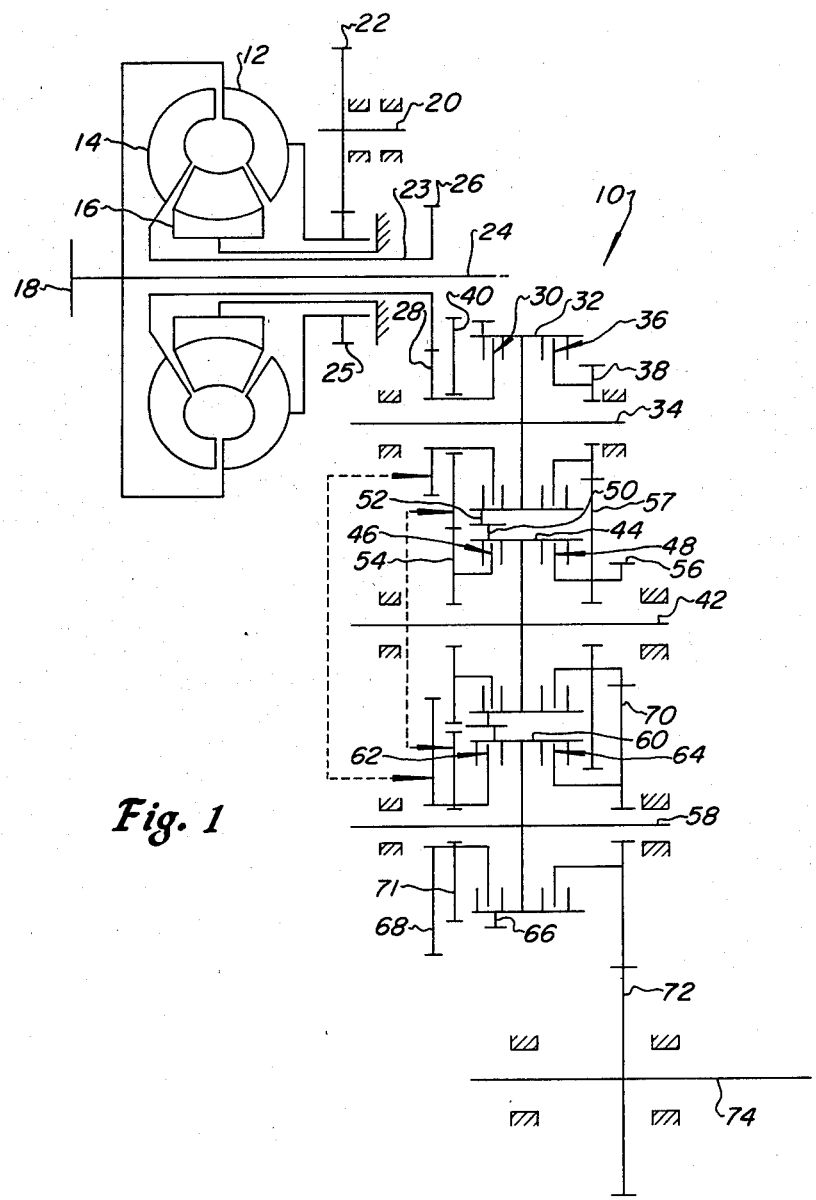
FIG. 1 is a schematic diagram illustrating a multispeed constant mesh gear transmission in accordance with the present invention.

Referring to FIG. 1, a multispeed constant mesh gear type transmission is illustrated in diagramatic form and generally designated by the numeral 10. The transmission 10 includes an arrangement of gears and clutches suitably mounted on rotating shafts which are adapted to be rotatably supported in a housing. In order to simplify the disclosure and provide a concise detailed description herein elements such as bearings, clutch components, fluid passageways, and other conventional elements in the art of transmissions are not illustrated but are believed to be readily understandable to those skilled in the art of transmission design. For a detailed illustration and description of the type of hydraulically actuated multiplate clutch which is preferred for the clutches of the transmission 10 reference may be had to assigned to U.S. Pat. No. 3,913,411 assigned to the assignee of the present invention.

The transmission 10 is particularly adapted to include a hydrodynamic torque converter including an impeller 12 adapted to drive a turbine 14 through a fluid circuit including a stator member 16, all components being well known to those skilled in the art. The impeller 12 is suitably connected to a prime mover such as an internal combustion engine, not shown, by way of an input drive flange 18. The transmission 10 includes an auxiliary power takeoff shaft 20 connected to a gear 22 meshed with a gear 25 drivably connected to the impeller 12 as shown.

Figures 2, 3:
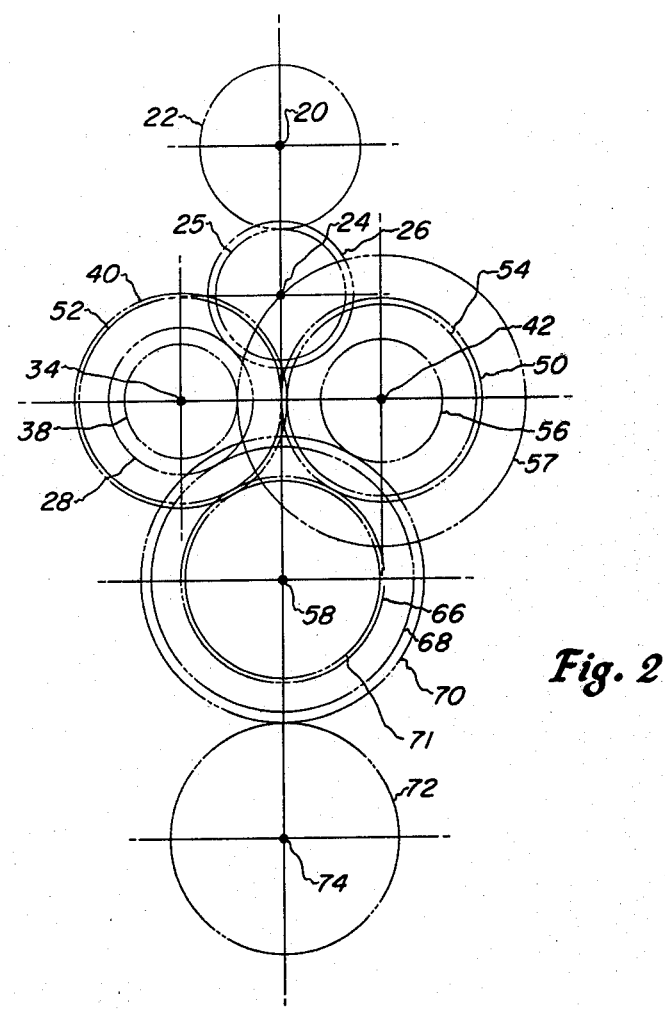
FIG. 2 is a schematic diagram taken along a line perpendicular to the axes of rotation of the shafts of the transmission of FIG. 1 illustrating the spacing configuration of the shafts.
FIG. 3 is a table showing the schedule of clutches engaged for the various speed ratios in forward and reverse direction of rotation of the output shaft of the transmission of FIG. 1.

The turbine 14 is connected to a shaft 23 rotatable about an axis 24 and drivingly connected to an input gear 26. Referring also to FIG. 2, the shaft 23, is represented in an end view by the axis 24 which is formed at the top of a cruciform configuration of the arrangement of the shafting of the transmission 10. The input gear 26 is in constant mesh with a gear 28 operable to be connected to a first directional clutch 30 which is preferably of the general type disclosed in U.S. Pat. No. 3,913,411 and having a clutch drum 32 fixed to a suitable rotatable shaft designated by the axis 34. A speed change clutch 36 is also formed in part by the clutch drum 32 and is driveably connected to a gear 38 mounted on and rotatable with respect to the axis of the shaft 34. A third or idler gear 40 is mounted between the gear 28 and the clutch 30 and is rotatable with respect to the gear 28 and the clutch 30.

A second intermediate shaft, designated by the numeral 42, is arranged opposite the shaft 34 and spaced the same distance from the shaft 23 as the shaft 34. The shaft 42 is connected to a clutch drum 44 of a pair of multiplate fluid actuated clutches 46 and 48. The clutch drum 44 includes a gear 50 which is in constant mesh with a gear 52 mounted on the clutch drum 32. The clutch 46 is a directional clutch and is connectable to a gear 54 which is in constant mesh with the gear 40 and rotatable about the axis of the shaft 42. The clutch 48 is a speed change clutch and is connectable to a gear 56 also rotatably mounted about the axis of the shaft 42. The gear 56 is fixed to a gear 57 rotatable about the axis of shaft 42 and meshed with the gear 38.

The transmission 10 includes a third intermediate shaft 58 which is arranged, as shown in FIG. 2, to be rotatable about an axis lying in a plane including the axis of the shaft 24 and perpendicular to a plane containing the axes of rotation of the shafts 34 and 42. A third clutch drum 60 is fixed to the shaft 58 for rotation therewith and forms a part of separate respective directional and speed change clutches 62 and 64 similar to the previously described clutches. The clutch drum 60 includes a gear 66 mounted on the periphery thereof and in constant mesh with the gear 50 mounted on the clutch drum 44. A gear 68 is mounted for rotation about the axis of the shaft 58 and is in constant mesh with the gear 28 as indicated by the dashed line and arrows of the schematic diagram of FIG. 1. The gear 68 is adapted to be drivenly connected to the clutch 62 and is also fixed to a gear 71 which is constant mesh with the gear 40 as indicated in FIG. 1. The gears 68 and 71 are fixed to each other for rotation in unison. The clutch 64 is connected to a gear 70 which is in constant mesh with the gear 56 and also with a gear 72 mounted on an output shaft 74. The shaft 74 has an axis of rotation lying in the same plane as the axes of rotation of the shafts 23 and 58 as shown in FIG. 2. Alternatively, the gear 70 could be connected to a shaft coaxial with the shaft 58.

As may be appreciated from the foregoing description a gear train is formed by the input gear 26 together with gears 28, 68, 71, 40 and 54, all of which are rotatably entrained with each other at all times during the operation of the transmission 10. The gears 28 and 54 serve as input gears to the respective forward directional clutches 30 and 46. The gear 68 serves as an input gear to the reverse directional clutch 62. Accordingly, the transmission illustrated in FIGS. 1 and 2 can be operated to provide for six speeds in one or a forward direction by engagement of either the clutch 30 or the clutch 46 in combination with, respectively, the clutches 36, 48 and 64 to provide a range of gear ratios preferably ranging from a low or first ratio of approximately 9 to 1 to a high or sixth gear ratio of approximately 0.8 to 1, the ratio being that of the rotative speed of the input shaft 23 to that of the output shaft 74. As previously mentioned the output shaft could be arranged to be coaxial with the shaft 58 and suitably connected to the gear 70. The transmission 10 may also be advantageously operated to provide a range of three speed ratios of the input shaft with respect to the output shaft by engagement of the clutch 62 in combination with, respectively, any one of clutches 36, 48 or 64. The table of FIG. 3 illustrates the combination of clutches engageable to provide the six forward speeds and three reverse speeds possible with the arrangement of gearing and clutches of the transmission 10.

It is believed that those skilled in the art will recognize from viewing the drawing figures in conjunction with the schedule of engaged clutches designated in FIG. 3 which gears are entrained to transmit power from the input shaft 23 to the output shaft 74. Referring to FIG. 3, the left hand column of the table refers to the numerical designations of the six speed ratios of the input shaft 23 with respect to the output shaft 74, with the numeral designation 1 being the first gear or highest ratio of input shaft speed to output shaft speed and the numerical designation 6 being the lowest speed ratio, respectively. The column adjacent to the speed range designations lists the clutches engaged to provide for rotating the output shaft 74 in the so called forward direction of rotation and the right hand column lists the combinations of clutches engaged for the opposite or reverse direction of rotation.

In the first gear range forward directional clutch 46 and speed change clutch 36 are engaged to provide power output through gears 26, 28, 68, 71, 40, 54, 50, 52, 38, 57, 56, 70 and 72.

In a second or intermediate gear forward directional clutch 30 and speed change clutch 36 are engaged to provide for rotation of the output shaft through gears 26, 28, 38, 57, 56, 70 and 72.

In a third intermediate gear forward directional clutch 46 and speed change clutch 48 are engaged to drive the output shaft through gears 26, 28, 68, 71, 40, 54, 56, 70 and 72.

In a fourth intermediate gear forward directional clutch 30 and speed change clutch 48 are engaged to drive the output shaft through gears 26, 28, 52, 50, 56, 70 and 72.

In a fifth intermediate gear directional clutch 46 and speed change clutch 64 are engaged to drive the output shaft 74 through gears 26, 28, 68, 71, 40, 54, 50, 66, 70 and 72.

In the sixth gear, which provides the lowest ratio of input shaft speed with respect to output shaft speed, directional clutch 30 and speed change clutch 64 are engaged to drive the output shaft through gears 26, 28, 52, 50, 66, 70 and 72.

For reverse rotation of the output shaft 74, with respect to the direction of rotation for the six forward speeds, in a highest reverse gear ratio directional clutch 62 and speed change clutch 36 are engaged to drive the output shaft 74 through gears 26, 28, 68, 66, 50, 52, 38, 57, 56, 70 and 72.

In an intermediate reverse gear directional clutch 62 and speed change clutch 48 are both engaged to drive the output shaft through gears 26, 28, 68, 66, 50, 56, 70 and 72.

In a third and lowest ratio in the reverse direction of rotation of the output shaft 74 directional clutch 62 and speed change clutch 64 are engaged to drive the output shaft through gears 26, 28, 68, 70 and 72.

By way of example only, a preferred range of speed ratios is obtained for the transmission 10 wherein the gears have numbers of teeth in accordance with the following tabulation:

| Gear | No. of Teeth |
|---|---|
| 26 | 30 |
| 28 | 30 |
| 38 | 24 |

-continued

| Gear | No. of Teeth |
|---|---|
| 40 | 44 |
| 50 | 56 |
| 52 | 56 |
| 54 | 40 |
| 56 | 24 |
| 57 | 60 |
| 66 | 56 |
| 68 | 54 |
| 70 | 60 |
| 71 | 40 |
| 72 | 48 |

Figure 4:
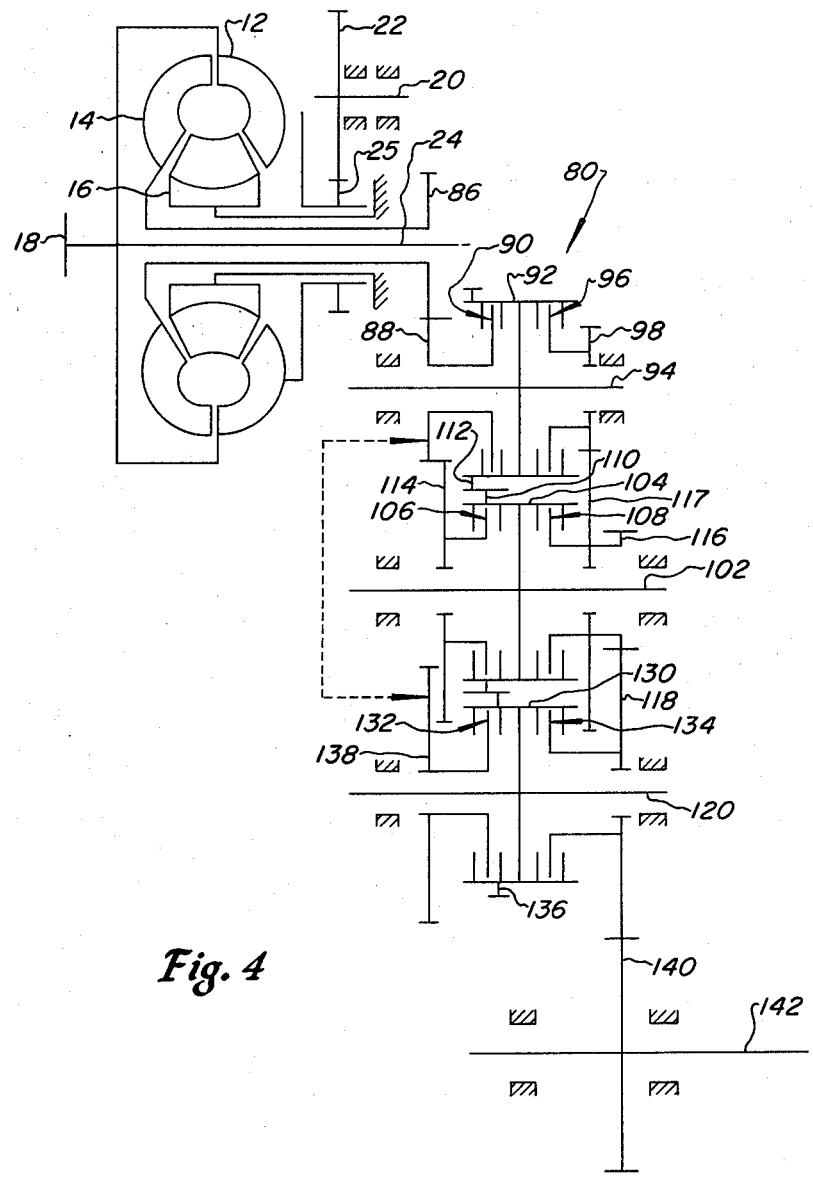
FIG. 4 is a schematic diagram of an alternate embodiment of the present invention.
Figures 5, 6:
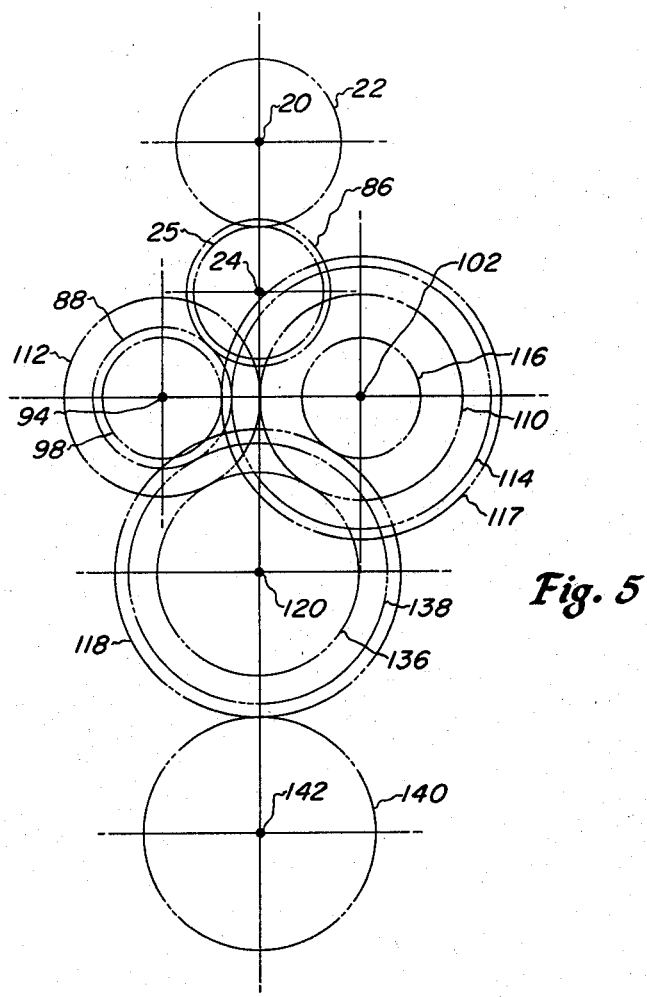
FIG. 5 is a schematic diagram taken along a line perpendicular to the axes of rotation of the shafts of the embodiment shown in FIG. 4.
FIG. 6 is a table showing the schedule of clutches engaged for the various speed ratios in forward and reverse directions of rotation for the embodiment shown in FIG. 4.

An alternate embodiment of the present invention is illustrated in schematic form in FIGS. 4 and 5 of the drawings. Referring to FIG. 4, a multispeed power shift constant mesh gear transmission is illustrated and generally designated by the numeral 80. The transmission 80 includes the same general configuration or arrangement of shafting as the transmission 10 and may be formed to be mounted in the same housing as provided for the transmission 10. The transmission 80 is also adapted to include a hydrodynamic torque convertor having the impeller 12, turbine 14 and stator 16 arranged in the same manner as for the transmission 10. The transmission 80 also includes the auxiliary power takeoff shaft 20 drivenly connected to a gear 22 meshed with a gear 25 fixed to the impeller 12. The turbine output shaft 23 of the transmission 80, which also serves as the gearing input shaft, is drivingly connected to an input gear 86 rotatable about axis 24. The gear 86 is in constant mesh with a gear 88 which is connectable to a fluid actuated directional clutch 90 including a clutch drum 92 drivenly connected to a shaft 94, the axis of which forms the axis of rotation of the gear 88. The clutch drum 92 also forms part of a speed change clutch 96 which is connectable to a gear 98 mounted for rotation with respect to the axis of the shaft 94.

The transmission 80 also includes a second intermediate shaft 102 which, as shown in FIG. 5, is mounted the same distance from the axis of the shaft 23 as the shaft 94. The shaft 102 is fixed for rotation with a clutch drum 104 forming a part of a clutch set comprising respective directional and speed change clutches 106 and 108. The clutch drum 104 includes a gear 110 which is in constant mesh with a gear 112 fixed to the clutch drum 92. The clutch 106 is connectable to a gear 114 rotatable about the axis of the shaft 102 and in constant mesh with the gear 88. The clutch 108 is connectable to gears 116 and 117 which are fixed to each other for rotation about the axis of the shaft 102. The gear 117 is in constant mesh with the gear 98 and the gear 116 is in constant mesh with a gear 118 mounted for rotation about the axis of a shaft 120 which lies in a plane including the axis 24 of the shaft 23 and perpendicular to a plane including the axes of the shafts 94 and 102.

The shaft 120 is fixed to a clutch drum 130 forming a part of a set of respective directional and speed change clutches 132 and 134. The clutch drum 130 includes a gear 136 on the periphery thereof which is in constant mesh with the gear 110 on the periphery of the clutch drum 104. The transmission 80 further includes a gear 138 connectable to the clutch 132, mounted for rotation about the axis of the shaft 120 and in constant mesh with the gear 88. The gear 88 is desirably provided to be of sufficient width to be in constant mesh with both the gears 114 and 138 in the configuration of the shafts 94, 102 and 120 as shown in FIG. 5. The clutch 134 is connectable to the gear 118 as indicated in FIG. 4.

As with the transmission 10 the output gear 118 of the shaft 120 may be directly connected to an output shaft coaxial with the shaft 120 or, as shown in FIG. 5, the gear 118 may be in constant mesh with a gear 140 connected to a rotatable output shaft 142 having a drop axis of rotation lying in the same plane as the axes of rotation of the shafts 24 and 120.

The transmission 80 also provides for operation in six speed ratios between the input shaft 23 and the output shaft 142 in one direction of rotation of the output shaft as well as three speed ratios in the opposite direction of rotation of the output shaft 142. Referring to the table of FIG. 6, the left hand column designates the range of speed ratios, designated 1 to 6 with the numeral 1 indicating the highest ratio between input shaft speed and output shaft speed and the numeral 6 referring to the lowest speed ratio. The column adjacent the speed range designation column lists the combination of clutches which are engaged when the output shaft is rotating in one or a so-called forward direction of rotation and the right hand column indicates the combinations of clutches which are engaged for the opposite direction of rotation of the output shaft 142.

In a first or lowest gear, with clutches 106 and 96 engaged, the output shaft 142 is rotatably driven through gears 86, 88, 114, 110, 112, 98, 117, 116, 118 and 140.

In a second intermediate gear, with clutches 90 and 96 engaged, the output shaft is driven through gears 86, 88, 98, 117, 116, 118 and 140.

In a third intermediate gear clutches 106 and 108 are engaged to drive the output shaft through gears 86, 88, 114, 116, 118 and 140.

In a fourth intermediate gear clutches 90 and 108 are engaged to drive the output shaft through gears 86, 88, 112, 110, 116, 118 and 140.

In a fifth gear clutches 106 and 134 are engaged to drive the output shaft through gears 86, 88, 114, 110, 136, 118 and 140.

In sixth or high gear clutches 90 and 134 are engaged to drive the output shaft through gears 86, 88, 112, 110, 136, 118 and 140.

In order to rotate the shaft 142 in the opposite direction of rotation reverse directional clutch 132 is engaged with speed change clutch 96 to obtain the highest ratio of rotative speed of the input shaft with respect to the output shaft by driving the output shaft through gears 86, 88, 138, 136, 110, 112, 98, 117, 116, 118 and 140.

An intermediate speed ratio in reverse is obtained through engaging clutches 132 and 108 to drive the output shaft 142 through gears 86, 88, 138, 136, 110, 116, 118 and 140.

In the lowest ratio of input to output shaft speed, in reverse, clutches 132 and 134 are engaged to drive the output shaft through gears 86, 88, 138, 118 and 140.

By way of example only, a preferred number of teeth for the respective gears of the transmission 80 are set forth below in the following tabulation:

| Gear | No. of Teeth |
| --- | --- |
| 86 | 30 |
| 88 | 30 |
| 98 | 25 |
| 110 | 56 |
| 112 | 56 |
| 114 | 53 |
| 116 | 24 |
| 117 | 58 |
| 118 | 60 |
| 136 | 56 |
| 138 | 53 |
| 140 | 48 |

As will be appreciated from the foregoing description two embodiments of a multispeed constant mesh gear transmission having six speed ratios in one rotational direction and three speed ratios in an opposite or reverse direction are provided which are compact, have a minimum number of gears and clutches, and provide for a preferred arrangement of the gears and clutches to achieve a reliable and compact transmission superior to heretofore known transmission adapted for the same operation and use. Accordingly, those skilled in the art will recognize that modifications may be made which will remain within the spirit and scope of the invention covered by the appended claims.

What we claim is:

1. A multispeed constant mesh gear transmission including an input shaft and an output shaft, said transmission being operable to provide six speed ratios between said input shaft and said output shaft in one direction of rotation of said output shaft and three speed ratios between said input shaft and said output shaft in the opposite direction of rotation of said output shaft, said transmission comprising:

an input gear drivenly connected to said input shaft and rotatable about an input axis;
a first clutch set including a first directional clutch and a first speed change clutch drivingly engageable with each other and disposed about a first axis spaced from said input axis;
a second clutch set including a second directional clutch and a second speed change clutch drivingly engageable with each other and disposed about a second axis spaced from said first axis and said input axis
a third clutch set including a third directional clutch and a third speed change clutch drivingly engageable with each other and disposed about a third axis spaced form a said input, first, and second axes;
first, second and third gears disposed for rotation about said about said first, second, and third axes, respectively, and respectively engageable through said respective first, second and third clutch sets with fourth, fifth and sixth gears disposed for rotation about first, second and third axes, respectively;
a seventh gear fixed to said fifth gear for rotation about said second axis;
said first gear being meshed with said third gear, said fourth gear being meshed with said fifth gear, said seventh gear being meshed with said sixth gear, and said second gear being meshed with said first gear.
eighth and ninth gears meshed with each other and respectively associated with said first and second clutch sets for drivingly interconnecting said first gear with said fifth and seventh gears through said first directional clutch and said second speed change clutch;

a tenth gear associated with said third clutch set and meshed with said ninth gear for drivingly interconnecting said first gear with said sixth gear through said first directional clutch and said third speed change clutch;

an output gear drivingly connected to said output shaft and mounted for rotation about an output axis spaced from said third axis, said output gear being meshed with said sixth gear, said input axis, said third axis and said output axis lying in a common plane, and said second and third axes lying in a common plane intersecting the plane of said input, third and output axes.

* * * * *